July 11, 1933.  J. B. FULLERTON ET AL  1,918,026
BRAKE TESTING MACHINE
Filed June 13, 1927   10 Sheets-Sheet 4

Inventors
J. B. Fullerton
C. F. Rossetter
By Hazard and Miller
Attorneys.

July 11, 1933.   J. B. FULLERTON ET AL   1,918,026
BRAKE TESTING MACHINE
Filed June 13, 1927   10 Sheets-Sheet 6

Inventors
J. B. Fullerton
C. F. Rossetter
By: Hazard and Miller
Attorneys.

July 11, 1933.    J. B. FULLERTON ET AL    1,918,026
BRAKE TESTING MACHINE
Filed June 13, 1927    10 Sheets-Sheet 7

INVENTORS
J. B. FULLERTON
C. F. ROSSETTER
BY Hazard and Miller
ATTORNEYS July 11, 1933. J. B. FULLERTON ET AL 1,918,026
BRAKE TESTING MACHINE
Filed June 13, 1927   10 Sheets-Sheet 10

INVENTORS
J. B. FULLERTON
C. F. ROSSETTER
BY Huzard and Miller
ATTORNEYS

Patented July 11, 1933

1,918,026

UNITED STATES PATENT OFFICE

JAMES B. FULLERTON AND CHARLES F. ROSSETTER, OF LOS ANGELES, CALIFORNIA, ASSIGNORS, BY MESNE ASSIGNMENTS, TO BENDIX-COWDREY BRAKE TESTER, INC., A CORPORATION OF DELAWARE

BRAKE TESTING MACHINE

Application filed June 13, 1927. Serial No. 198,414.

Our invention is a combined brake testing machine and recording mechanism for testing brakes and registering the result of the test.

An object of our invention is testing brakes by which a standardized test may be devised and a printed record may be obtained of this test so that standards may be established for brake tests for different types of automobiles and that these may be of such a nature that official test cards will be required of motorists in the same manner as in some states they are required to carry head-light adjustment certificates and drivers' licenses.

A further object of our invention is a brake testing machine on which a pair of wheels of an automobile may be mounted, this machine being positively driven and thus rotating the wheels and having equipment connected therewith which may be operated by a person sitting in the driver's seat and actuating the brakes to test the resistance of the brakes and thus the power required to turn the wheels when the brakes are applied. In connection with such a machine we couple a recording mechanism which gives a record and a visible indication of the test, that is the pressure of the resistance of the brakes, this recording machine giving an independent record for each wheel under test and being manipulated by an electric switch actuated by the test operator in the driver's compartment of the vehicle.

A more specific object of one form of our invention in the testing or resistance machine is utilizing a plurality of drums with idlers to support the wheels of a vehicle. The drums are positively driven and have a mechanism, when a resistance is created by braking the wheels, to shift a plurality of tubes or the like longitudinally and thereby actuate levers, which levers have cables or the like connected to a registering machine.

A more specific object of one form of our invention relative to the testing and resistance feature is to support the vehicle wheels on a plurality of drums with idlers, one of the drums having a shaft concentric to the shaft of the other drum and each drum is driven by a flexible drive, and on the brakes being applied to the vehicle wheels the slack in the flexible drive is taken up by a resistance machine, which machine operates much on the principle of a weighing machine.

A more specific object in the registering machine is the use of pointers operating over a scale and also printing wheels, these being in duplicate for each wheel under test, and in connection with such construction we utilize a printing platen or the like which may be raised and lowered to place a card under the printing wheels, this platen being actuated either manually or by electrically controlled mechanism at the proper moment to give the maximum resistance test of the brakes.

A further object of our invention is the mounting of the testing machine whereby it automatically adjusts itself to a square or right angular alignment with the longitudinal axis of the vehicle so that the brakes are given a fair test as in straight ahead running, such construction accommodating itself to the vehicle should the vehicle be slightly skewed in the direction to the normal position of the testing machine.

In constructing one form of the resistance or testing machine proper we prefer to mount this in a pit or the like in a box like or housing structure mounted on a turntable type of construction and in this housing we have a cylinder of such length as to pass under a pair of wheels of an automobile and laterally to a driven connection with an electric motor and on this cylinder are mounted a pair of drums on antifriction bearings. These drums are interconnected with the cylinder by a torsion spring and hence on driving the cylinder the drums are rotated in the proper direction to turn the automobile wheels in the direction of forward travel. Interconnected to each drum is a nut having heavy threads and with each nut there meshes a screw. The screws are interconnected with concentric sleeves or tubes and when the brakes are applied and slow up the rotation of the wheels, thus retarding the turning of the drums, the springs are given a greater twist causing a relative motion between the nuts and the screws and hence shifting the screws longitudinally and hence sliding the sleeves. These sleeves are each connected to pivotally mounted levers at one side of the machine, the levers thus being actuated in accordance with the relative movement of the sleeves and hence the retardation of the drums.

In the other form of our invention the drums supporting the vehicle wheels are mounted on shafts, one of which is concentric to the other, and both leading to one side of the testing machine. An electric motor through the medium of a chain drive actuates each of the shafts, such chain drive passing over an idler sprocket which is connected to a weighing or balancing lever, this lever being connected to a resistance such as a spring resistance. Therefore, when the brakes are applied to the vehicle the slack in the chain drive is reduced, giving a pull on the idler and hence actuating the weighing lever against the resistance of the springs.

The registering mechanism is mounted in a suitable stand at one side of the housing and has a graduated scale over which operate a pair of pointers, one pointer for each wheel under test. Interconnected with such pointers are a pair of printing wheels having type on their periphery. A shelf is located below the type wheels and has a vertically slidable platen thereon. This platen is elevated by either a manually controlled mechanism or by an electrically controlled, through the medium of a switch connected to a cable, which cable is flexible and may be taken by the testing operator to the driver's compartment of the automobile. The levers of the testing or pressure machine are interconnected with the indicating pointers or arms and the printing wheels.

The registry mechanism for the second form of the invention has a pair of concentric shafts with pointers thereon, as well as a pair of concentric shafts with printing discs thereon. A pair of flexible chains extend over the sprockets on both sets of shafts, the chains being connected to a counter weight; the other ends of the chains are connected to each of the balancing levers which are actuated by the resistance in the main flexible drive, thus the movement of the levers rotates the concentric shafts on the pointers and the printing disc, so that different braking resistances are indicated by the pointers and the pounds resistance may be registered by the printing discs printing on cards or the like. These cards are brought into engagement with the printing disc preferably by an electro-magnetic device giving an instantaneous reading.

Our invention will be more readily understood from the following description and drawings, in which.

The general mounting of the testing and registering apparatus is substantially as follows:

A pit 11 is constructed in a runway or the like and in the base of the pit are constructed tracks 12 and a center pivot 13 to support a turntable type of device such as the box like housing 14 in which most of the mechanism is mounted. Compression springs 15 are secured in one or more walls of the pit and bear against the housing, tending to hold this in a right angular position to the longitudinal center axis of the runway. At one side of the housing is located the resistance mechanism, indicated generally by the numeral 16, and at one side is the registering mechanism, indicated generally by the numeral 17.

The testing drums and their mounting are substantially as follows, having reference particularly to Figs. 1 through 5:

A cylinder 18 is mounted on antifriction journals 19 suitably supported in the housing, and at one end has a gear 20 which meshes with a pinion 21 on a counter-shaft 22, this gear, pinion and counter-shaft, being preferably in the base of the registering mechanism 17. The idler carries a gear 23 which meshes with a pinion 24 on the shaft 25 of the electric motor 26, this motor being housed in any suitable position but preferably mounted in the main housing of the resistance mechanism.

A pair of drums 27 are mounted on antifriction bearings 28, thus having a loose rotational mounting on the cylinder 18, these drums being of similar character and each having a torsion spring 29 of the rat-trap double coiled type, in which the two ends of each spring are connected by eyes over the pins 30 of bars 31, which are riveted or otherwise secured to each of the drums interiorly. A collar 32 for each spring is keyed on the cylinder 18 and has a radially extending lug 33 with a recess 34 adjacent thereto, the lug catching in a cross return bend of the double coiled spring.

Connected to each drum is a nut 35 which has heavy interior threads and each nut meshes with a corresponding screw 36 which is slidably mounted on the outside of the cylinder 18. The screws are longitudinally slidable with the cylinder 18 but rotate therewith. Each screw is connected to a cross bar 37 and these cross bars are rigidly secured to concentric sleeves or tubes 38 and 39. These tubes have slots 40 to accommodate their relative sliding motion when the screws slide longitudinally in the manner hereunder set forth.

In the base housing of the registering part of the mechanism we secure a bar 41 in an adjustable manner and on this bar are mounted levers 42 and 43 by means of pins 44, there being adjusting apertures 45 to allow shifting of the levers or the adjusting bars to give different leverages. Each of these levers is connected by pins 46 to a journal box 47 in which is mounted an antifriction bearing 48, there being one bearing for the outer and inner concentric sleeves 38 and 39, thus supporting said sleeves at their outer ends, the sleeves being held in proper position on their inner ends by a connection to the cross bars 37. Thus it will be seen that these concentric sleeves may rotate freely in the journal boxes 47 and that these sleeves are rotationally driven by the cylinder 18.

The manner of mounting and adjusting the wheels of the vehicle is substantially as follows, having reference particularly to Figs. 1, 2, 4 and 5:

An idler drum 49 for each main drum is rotationally mounted in a frame 50, having side arms 51 mounted on a pivot 52 forward of the testing drums, these arms having a lateral strap 53 at the back and underneath the idler drums. A bracket 54 is secured to each of the straps 53 and has a stud 55 on which is mounted a roller 56. These rollers bear on wedge blocks 57, such blocks being secured to a bar 58 mounted on suitable antifriction rollers 59 which are supported on a base plate 60.

These wedge blocks are shifted transversely of the drums by the following mechanism:

A small electric motor 61 is suitably located in the housing and has a worm and worm wheel connection 62 to a transverse screw 63 which is journaled in a suitable frame 64. This screw meshes with a nut 65 which is formed in a lug 66 extending upwardly from the bar 58.

The control of the motor 61 is substantially as follows:

Two push button switches 67, which are preferably located in the registering device 17, have connection to a source of power and electric leads 68 to a pair of contact plates 67. Double throw switch bars 70 are mounted on pivots 71 and are interconnected by a link 72. This link has a tension spring 73 and slidable pin 74 connecting it to a fixed center 75. The switch bars engage an insulating stud 76. These switch bars are connected by leads 77 to the motor 61, the motor being reversible.

In order that a single operator may test an automobile we utilize a remote electrical control for the various mechanisms and to this end provide a switch box 78 with a starting and stopping button switch 79 which has electric leads through a cable 80 and these leads are taken to the motor 26 to start and stop such motor.

The manner of operation of the testing machine so far described is substantially as follows:

The idler drums or rolls 49 are preferably lowered below the level of the runway by actuating the proper push button switch 67 in order to energize the motor 61 to traverse the bar 58 with the wedge blocks 57 in the proper direction to allow the frame 50, in which such idlers are journaled, to swing downwardly. The vehicle is then run onto the machine so that two of the wheels, such as the two rear wheels or the two front wheels, are resting on the main drums and the idler rollers. The proper push button switch 67 is then actuated to operate the motor 61 driving the screw 63 so as to traverse the bar 58 in the opposite direction and hence draw the wedge blocks 57 underneath the rollers 56, thereby elevating the frame 50 and the idler drum. It is preferable to raise these idlers into such a position so that the axle of the wheels is slightly to one side of the axis of the main drums, the wheels then engaging the drum in substantially the same relation as they would a level roadway.

Figure 1:
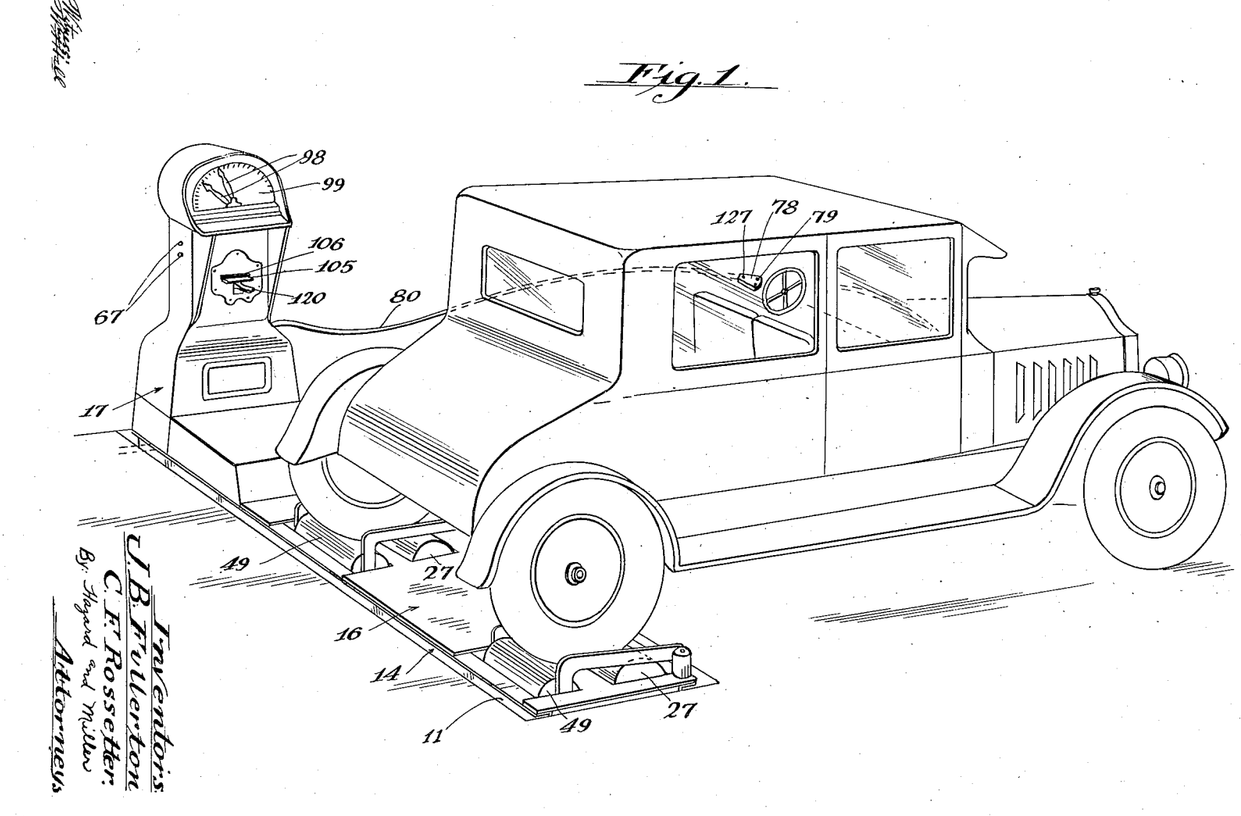
Figure 1 is a perspective view of our testing and registering mechanism, showing an automobile under test.
Figure 2:
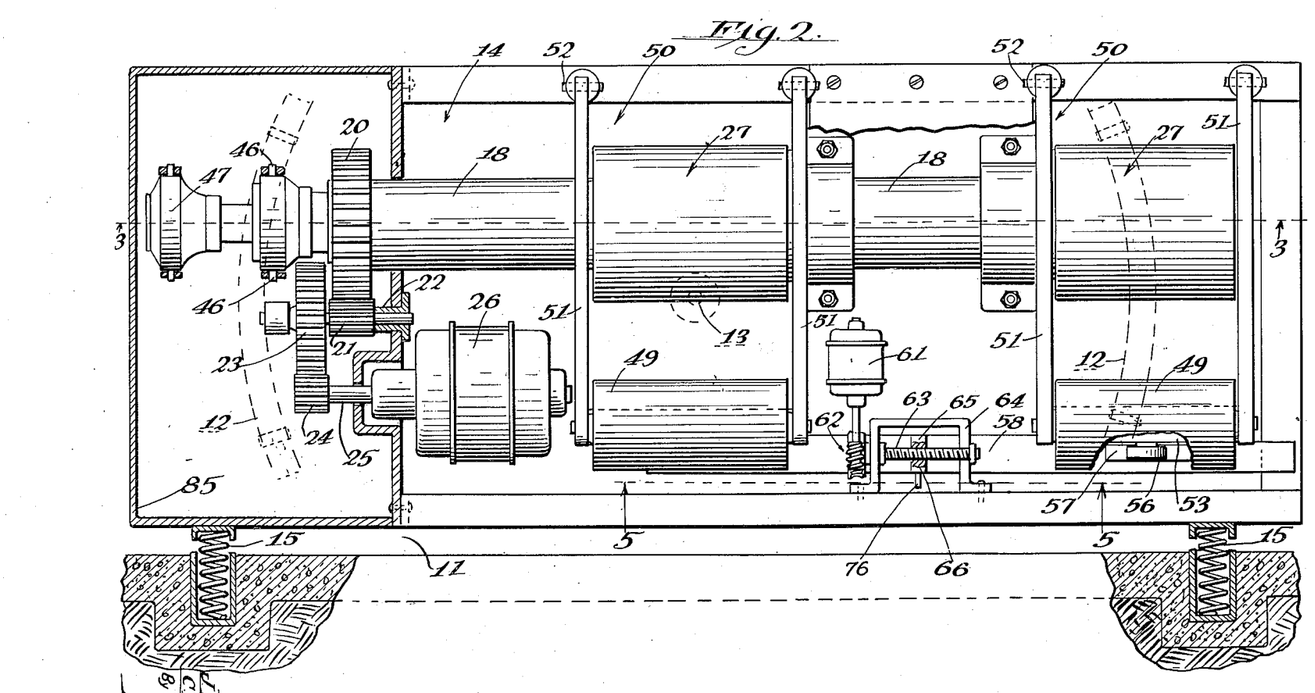
Figure 2 is a plan view of the testing machine proper, partly broken away to expose the interior construction.
Figure 3:
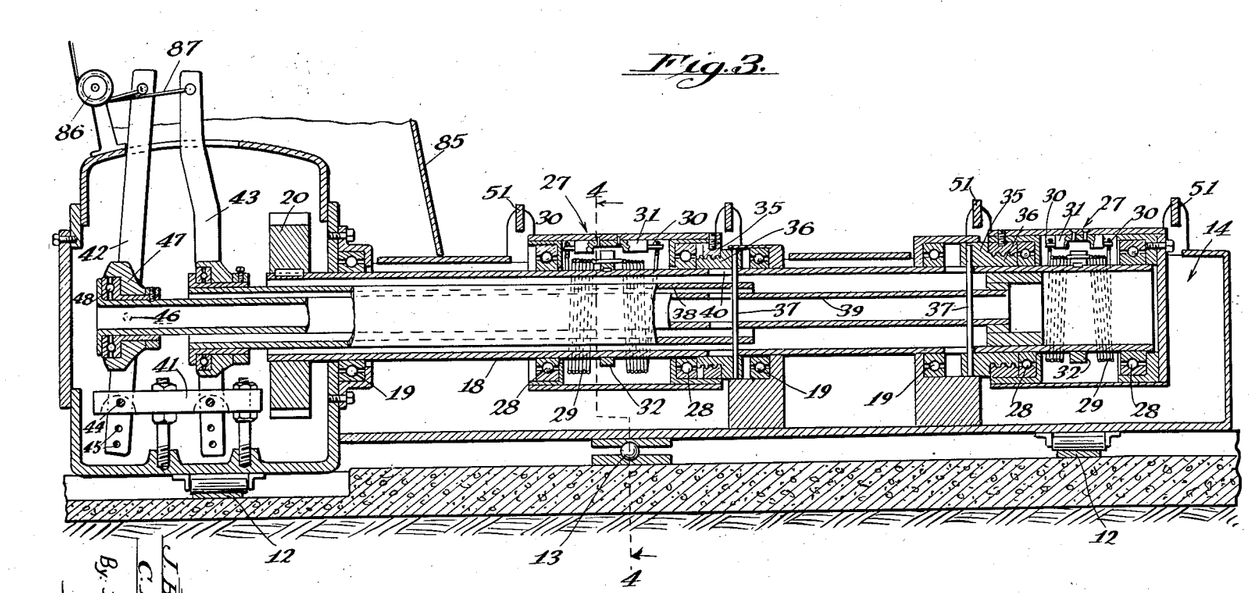
Figure 3 is a vertical transverse section on the line 3—3 of Fig. 2 in the direction of the arrows.
Figure 4:
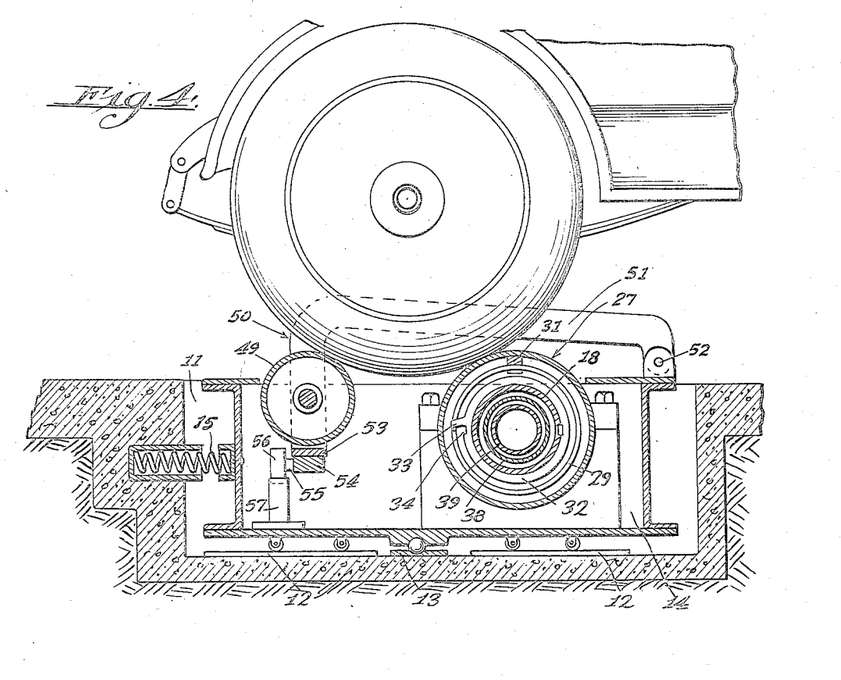
Figure 4 is a vertical longitudinal section on the line 4—4 of Fig. 3 in the direction of the arrows.
Figure 5:
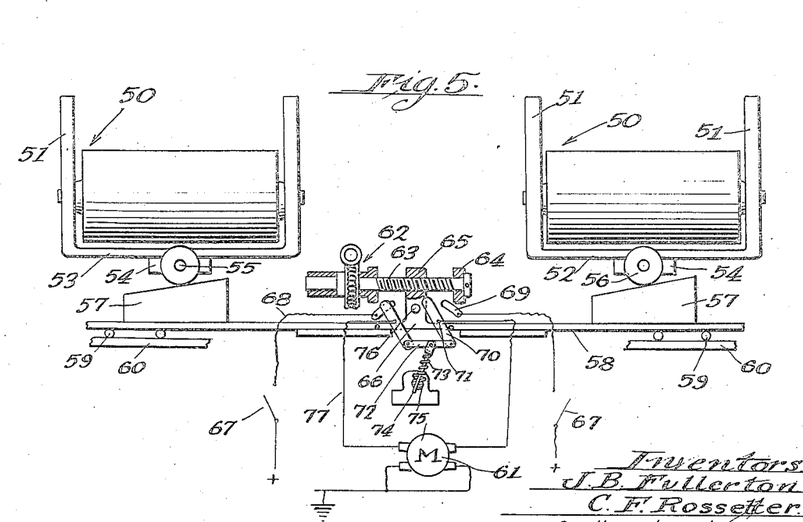
Figure 5 is a vertical transverse section on the line 5—5 of Fig. 2 in the direction of the arrows, showing part of the mechanism for raising and lowering the idlers and the electrical control therefor.

The throw over switch, shown in Fig. 5, is utilized to prevent too great a movement of the bar 58 and the wedge blocks in one direction or the other so that the nut 65 may not jam on the screw 63 but before any damage could be done the circuit would be broken by the pin 76 pushing the switch arms 70 in order to free such arms from one contact or the other and the spring 73 swings these arms to the other contact, allowing motion in the opposite direction when the second push button switch 67 is operated. It is to be understood that any suitable type of circuit breaking device for this purpose may be utilized.

When the vehicle is driven on the testing machine it may not be absolutely centered so that the axial center of the vehicle is on an axial center line of the testing machine but it may be skewed slightly over to one side. This skewed direction of the machine is accommodated by the housing in which the testing device is mounted being on a turntable type of device which allows it to turn slightly in one direction or the other so that a driving force would be transmitted to the wheels without any cross slipping action.

When the vehicle is properly set on the testing machine, the testing operator usually seats himself in the driver's compartment and by means of the remote control switch box 78, having the switches 79, starts the main electric motor 26 by energizing the circuit thereof. This motor, as above described, actuates the cylinder 18 on which the main drums 27 are mounted on antifriction bearings, and connected with the cylinder 18 by the torsion springs 29. These springs have considerable strength so that in normal rotation they are tensioned to a great extent, due to the friction of the wheels of the vehicle having to drive the differential and transmission mechanism for the rear wheels or for the slight friction of rotation of the front wheels. It is to be understood that the clutch of the vehicle will be out so that the engine is not turned over by the wheels. When the operator concludes the speed of the main drums 27 is sufficient, and this speed may be varied to correspond to different miles per hour of travel of a vehicle, he may apply the brakes to any graduated amount and watch the action of the machine by the indicating arms on the registering and recording mechanism, as hereunder set forth.

When resistance to rotation of the wheels is caused by the action of the brakes, the drums 27 tend to lag in rotational speed in relation to the rotation of the cylinder 18, this increasing the tension of the springs 29. The relative rotational movement between the nuts 35 and the screws 36 slidable on the cylinder 18 causes these screws to move longitudinally on the cylinder and as each screw is connected by means of the cross bar 37 to either the outer or inner sleeve 39, these sleeves are moved in a longitudinal direction in relation to the cylinder 18.

As the sleeves at their outer end are connected to the journals 47 and these journals are pivotally connected to the levers 42 and 43, which levers are connected to fixed pivots 44 at their lower end; the upper ends of such levers will then be shifted in an exaggerated amount over the movement of the cylinders. The amount of movement of the levers may be any desired multiple of the movement of the sleeves by utilizing levers of different lengths and different adjustments at their base. The movement of these levers actuates the indicating and the registering mechanism as here under described.

The registering and indicating mechanism of our brake tester is constructed substantially as follows, having reference particularly to Figs. 1, 2, 6, 7 and 8:

As above mentioned, the registering mechanism is indicated generally by the numeral 17 and is contained in a stand 85 which may be of any suitable character and is preferably made somewhat ornamental. This stand has a pair of pulleys 86 mounted therein somewhere adjacent the base, and over these pulleys pass the cables 87 from the levers 42 and 43. These cables extend upwardly and are each coupled to an endless chain 88 by couplings 89. Each chain takes over an idler sprocket 90, an indicator sprocket 91, and a printing wheel sprocket 92, these sprockets being on shafts which are journaled in a frame 93, suitably mounted inside the stand. A turnbuckle type of connection 94 is used on the chain to allow adjustment thereof.

Figures 6, 8:
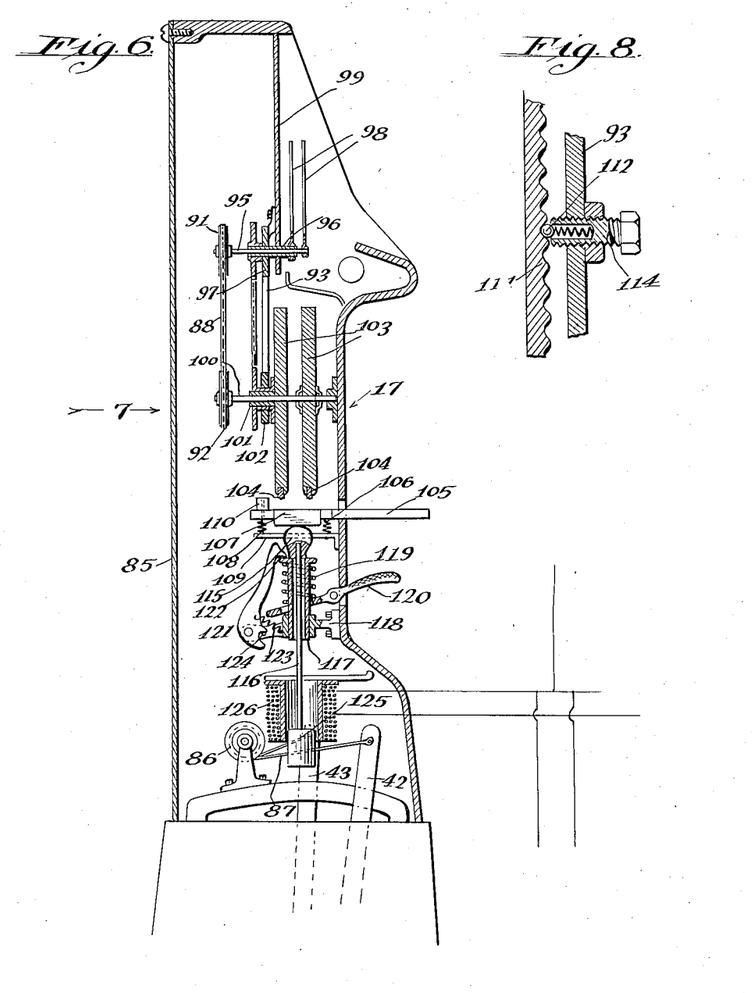
Figure 6 is a vertical transverse section through the registering machine, as if taken substantially on the line 6—6 of Fig. 7 in the direction of the arrows.
Figure 8 is a detail section developed on the line 8—8 of Fig. 7, taken in the direction of the arrows, showing the loose control of the printing wheels.
Figure 7:
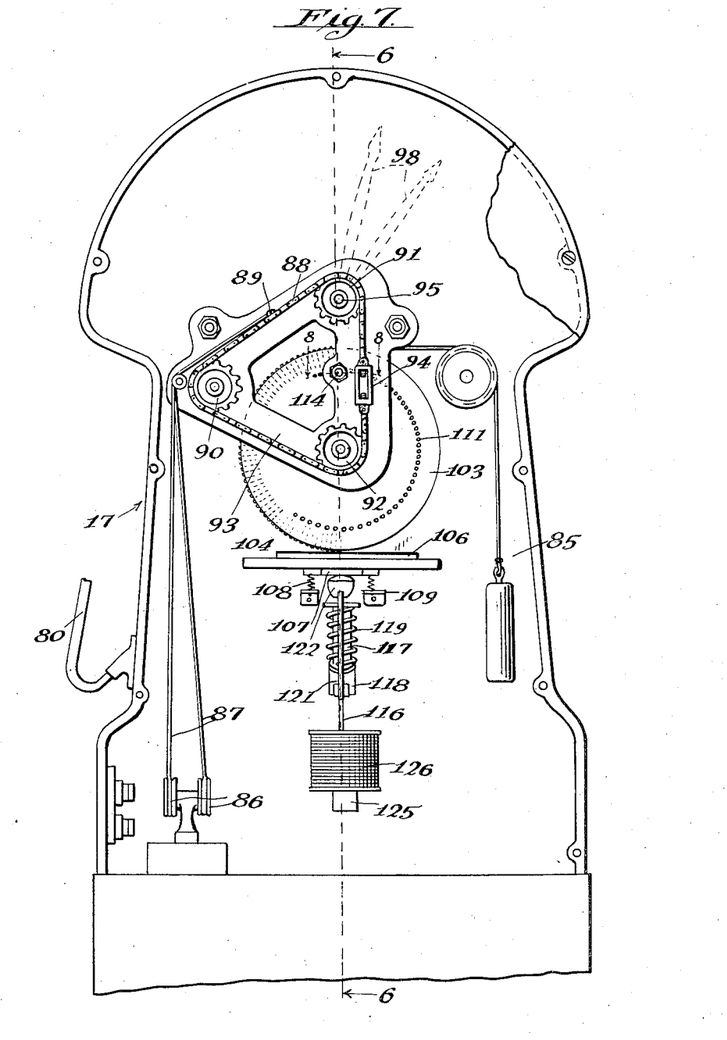
Figure 7 is a rear elevation of the registering mechanism, taken in the direction of the arrow 7 of Fig. 6, with the back cover plate mostly broken away.

One of the sprockets 91 is mounted on the solid shaft 95 whereas the other is mounted on a tubular shaft 96, these shafts leading through a suitable journal 97 to the pointer arms 98 which are in front of a plate 99 on which is calibrated a scale.

One of the sprocket wheels 92 is connected to a solid shaft 100 and the other to a tubular shaft 101, such shafts being concentric and mounted in a suitable shaft 102, and on each shaft is a printing wheel 103 having type 104 on its periphery. A shelf 105 is secured in a fixed position in the stand extending inwardly and outwardly therefrom and having a slot or opening 106 above the shelf. The shelf has a cut out section in which is mounted a platen 107 to have a slight sliding motion in a vertical direction and from this platen are tension springs 108 which are connected to rods 109 or other suitable support connected to the stand, drawing such platen downwardly. The shelf has a limit stop 110 to center the cards, on which the printing is made, properly in the machine. Each printing wheel is provided with a series of notches 111 extending in a circumferential direction and these notches are positioned close to each other forming a serrated portion of the wheels and a ball 112 for each wheel is pressed into these notches by a spring 113 which is adjusted on the set screw 114 having a bore at the end, these set screws being secured in the frames 93. The chains and sprockets have a rather loose fit so that when the sprockets are moved by the chains the ball sliding from one notch to the other causes a quick jump and centers the two wheels so that one of the type will be at the lowest position except during the brief interval of movement.

The mechanism for causing the printing by the type on a card positioned on the platen and inserted through the opening 106 above the shelf is substantially as follows:

A hammer 115 is mounted on a stem 116, this hammer in its lower position resting on a slidable sleeve 117, this sleeve being mounted in a bracket 118, and the tubular sleeve having a coiled spring 119 thereabouts, which is engaged by a hand lever 120 pivotally mounted in the stand and having an opening through which the sleeve 117 passes. Pivotally connected to the bracket 118 is a latch 121 which has a catch 122 at the upper end engaging over the upper end of the sleeve 117, there being a tension spring 123 to draw the latch into the forward position, as shown in Fig. 6, and a notch with a pin 124 to limit the movement of the latch. In addition to this the stem 116 has an armature 125 at its lower end, this armature having a movement in a solenoid 126, such solenoid having a wiring connection to a source of power and through the cable 80 to the push botton switch 127 on the switch box 78 of the remote control, which may be taken to the driver's compartment of the car.

The manner of operation of the indicating and registering mechanism above described is substantially as follows:

It will be understood that the testing operator before stepping into the driver's compartment of the car may insert the cards or the like on which the printing is to be made. We find a suitable type of card to be formed of several sheets of paper with copying carbon therebetween so that triplicate copies may be made and in such case the type do not require to be inked. If the device is operated electrically, the operator when he concludes the brakes are fully applied, and before slippage on the drums, operates the switch 127 which energizes the solenoid 126, this drawing up on the armature 125, elevating the stem 116, hence the hammer 115. This hammer thrusts upwardly on the platen 107, thus elevating the card into engagement with the type on the printing wheels 103. The operator may be guided as to operating the switch by watching the pointer arms 98 and when these come to a maximum position on the scale he may actuate the switch and thus obtain the maximum braking power of the brakes of the vehicle.

If it is desired to manually operate the printing, an operator may apply the brakes in the car either by the hand lever of the usual hand brake or by a foot pedal pressing device for the pedal brakes and when he ascertains that the braking power has reached its maximum, he may depress the hand lever 120. The inner end of such lever strikes the latch 121 so that the catch 122 is disengaged from the upper end of the sleeve 117. This action has compressed the spring 119 so that on release of the sleeve it is immediately thrust upwardly, forcibly pressing the hammer 115 against the platen 107 and raising the platen and the card into engagement with the type of the printing wheels. On releasing the lever 120 these parts return to their normal position, as shown in Fig. 6.

We propose to have a card printed, and by the term card we do not restrict ourselves to single copies but may make a number of copies on relatively thin paper, as above mentioned, and preferably print the registry of the brake test before the brakes are adjusted and then after they are adjusted. Before adjusting the brakes a pair of wheels will probably test different, that is the indicating pointers will point to different indications on the scale and different numbers will be printed on the card. The brakes should then be adjusted so that both the pointers will indicate substantially the same and the numbers printed on the card will be either the same or different by a predetermined allowance. In our machine we prefer to graduate the scales, which is done somewhat empirically, in equivalent pounds weight and thus obtain a reading showing how many pounds pressure is applied to the wheel by the brakes and by tabulation it may be ascertained what pressure is necessary for vehicles of different weights to form an effective stop for such vehicles at different speeds.

While we have illustrated the machine as mounted for the rear wheels being tested, it is to be understood that the front wheels may be tested in much the same manner by reversing the direction of the automobile. In this case, however, there may be a slight difference in resistance to rotation of the wheels over the turning force required for the rear wheels, as the rear wheels are required to drive the differential mechanism, the drive shaft, and some of the gearing in the gear transmission. Such transmission should, however, be engaged in neutral or else the clutch of the engine should be in the out position. If the torsion springs for driving the main drums from the main cylinder are such that they do not indicate any difference of driving force for the front and the rear wheels, it will not be necessary to make any computation for the difference of resistance in such driving, however, if such springs react with a considerable variance when driving the rear wheels, an allowance for this may be made in the braking test for the front and the rear wheels.

The construction of our invention, as illustrated in Figs. 9 through 15, is substantially as follows, and the housing and relative stationary parts of such construction are substantially as follows:

A box-like frame structure 201 is preferably mounted in a pit and is supported at the center of weight by a center ball 202, and at each side rollers 202' operate on arcuate tracks. This box frame structure may be of any suitable character and the pivotal mounting is to allow self-adjusting of the testing mechanism should an automobile be slightly out of the true line for testing. One of the wheel supporting drums 203 is mounted on a solid shaft 204. This is journaled on a frame 205 having an antifriction journal 206. The other wheel supporting drum 207 is mounted on a hollow shaft 208 through which the solid shaft 204 passes. Thus these shafts are concentric and the hollow shaft is supported at one end of a journal 209 having an antifriction bearing 210. The end of the solid shaft opposite the drum 203 is supported on a journal 211 having antifriction bearings 212, and the hollow shaft 208 is mounted on a journal frame 213 having antifriction bearings 214. A sprocket gear 215 is secured to the slide shaft and another sprocket gear 216 to the hollow shaft.

Figure 11:
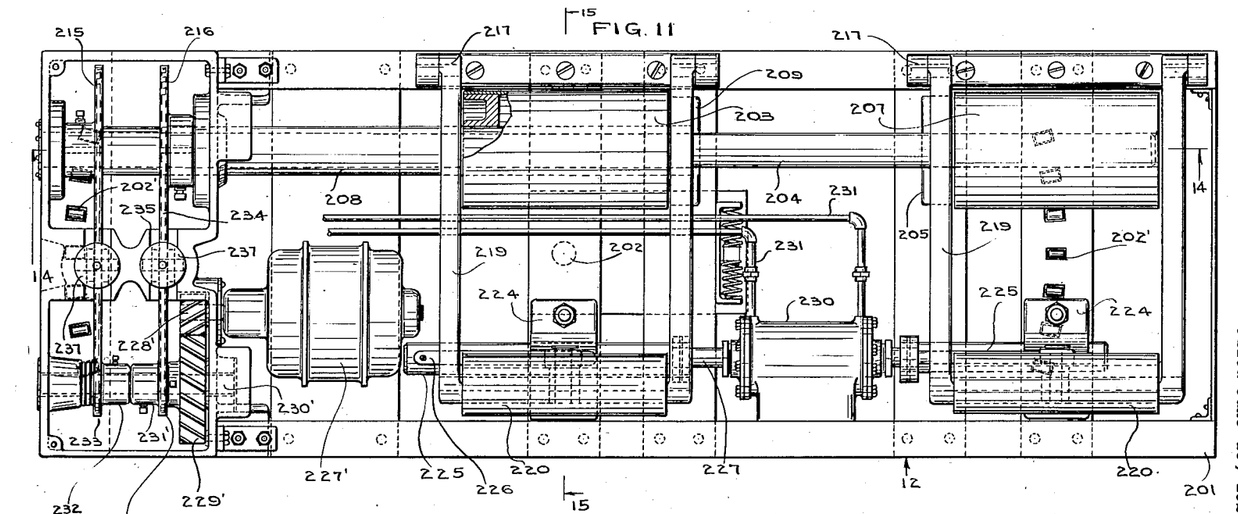
Figure 11 is a horizontal section on the line 11—11 of Fig. 10 in the direction of the arrows, showing part of the resistance and weighing stand in section, and the supporting drums and rollers in plan.
Figure 15:
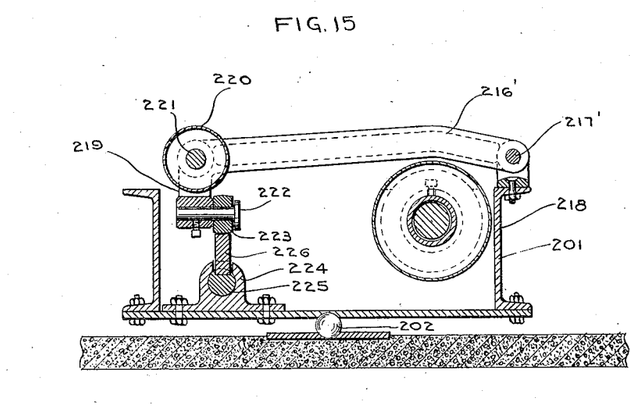
Figure 15 is a longitudinal section on the line 15—15 of Fig. 11 in the direction of the arrows through one of the wheel supporting drums and its associate idler drum.

Adjacent each of the vehicle wheel drums 203 and 207 there is a tilting frame 215' having arms 216' mounted on a fixed trunnion 217 supported on one of the side walls 218 of the box frame 201. The other ends of these arms are joined by the yoke 219, and between such ends and above the yoke there is an idler roller 220 mounted on an idler shaft 221. A stub shaft 222 is connected to each yoke and has a roller 223 connected thereto. The main drums 203 and 207 are spaced relatively to the idler drums 220 so that these two drums of each set will engage two vehicle wheels and on the tilting upwardly or downwardly of the idler drums, the main portion of the weight of the vehicle may be brought on the main drums 203 and 207, as hereunder set forth.

Figure 12:
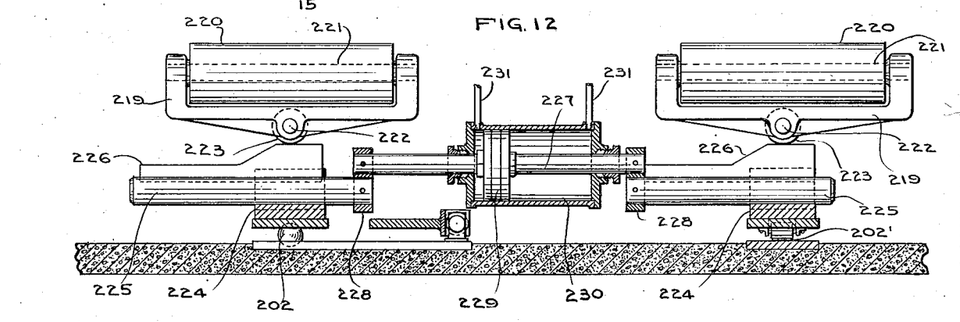
Figure 12 is a partial side elevation taken in the direction of the arrow 12 of Fig. 11, partly broken away, showing the adjustment feature for the idler rollers.
Figure 14:
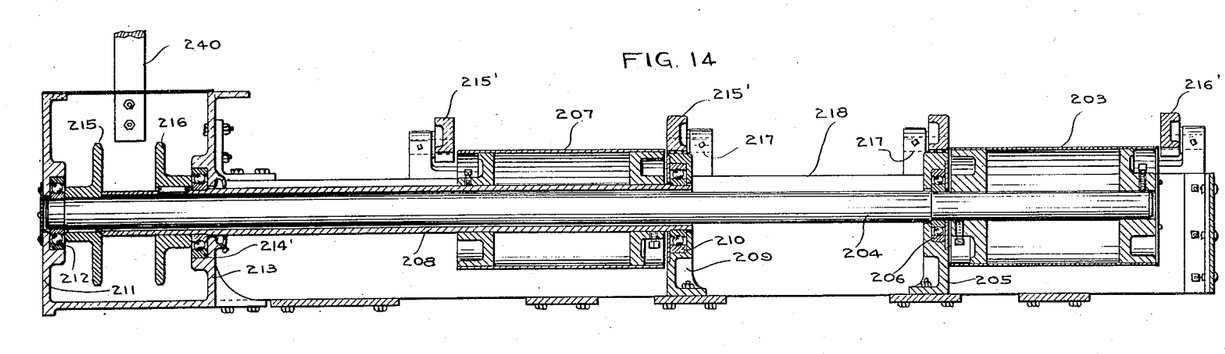
Figure 14 is a vertical transverse section on the line 14—14 of Fig. 11 in the direction of the arrows, illustrating the mounting of the driven wheel supporting drums and their connection with the driving gear.

The raising and lowering mechanism for the idler drums is substantially as follows, having reference particularly to Figs. 12 and 15:

Guide-way blocks 224 are mounted in the frame 201 and in these operate slide bars 225, each of which has a cam track 226. Interengaging these slide bars 225 is a piston rod 227, this being coupled to collars 228 on the slide bars, there being a piston 229 on the piston rod which is contained in a hydraulic cylinder 230 having feed and exhaust pipes 231. In accordance with the position of the piston in the cylinder, which cylinder is mounted in a fixed relation to the frame 201, the rollers 223 connected to each of the yokes 219 occupy different positions on the cam track 226, thus they may be lifted to the full extent of the track, as shown in Fig. 12, or lowered to the complete extent by shifting the piston rod to the piston end of the cylinder, or the rollers may be supported in any intermediate position on the inclined surface of the cam track 226.

The wheels of the vehicle having the brakes tested are run on the rollers 203 and 207. and the idler rollers 220, so that the tire of each wheel is supported by two rollers and the idler rollers are tilted up, therefore bringing the main weight of the wheel and the part of the vehicle supported thereon on the driven rollers 203 and 207.

The manner of driving these rollers is substantially as follows, having reference particularly to Figs. 9, 10, 11 and 14:

An electric motor 227' is mounted in any suitable place in the main frame 201 and drives a pinion 228'. This pinion meshes with a main gear 229' on a drive shaft 330', the shaft being journaled in any suitable manner in the main frame. On this shaft there are two sprocket gears 231 and 232 over which pass drive chains 233 and 234. These drive chains lead respectively to the sprockets 216 and 215 on the tubular shaft 208 and the slide shaft 204 respectively. Rigidly mounted in the frame there are a pair of posts 235, each having a vertical slide-way 236 therein and in this slide-way there are mounted sliding blocks 237 carrying an idler sprocket 238. The sprocket chains 233 and 234 pass over these idlers 238, as well as over a pair of idlers 239 mounted in a fixed position on the posts. The idlers 238 in cooperation with the blocks 237 operate the pressure resistance testing device, or what may be termed the weighing part of the machine.

The resistance testing or weighing part of the machine is constructed substantially as follows, having reference particularly to Figs. 9, 10 and 11:

A suitable frame 240 extends upwardly above the main box frame 201 and is preferably mounted in a stand 241 which houses the registering and indicating mechanism, as hereunder set forth. A stud 242 is connected to the frame and a pair of weighing or balancing levers 243 are pivotally connected to such stud. These balancing levers have an opening 244 and from each of the blocks 237 there are hooks 245 having ends 246 engaging in the openings 244 in each of the balancing or weighing levers 243. Suspended from the upper part of the frame 240 from a pin 247 there are a pair of springs 248 mounted in suitable casings 249, and the lower end of these springs terminate in eyes 250, which interengage with the hooks 245. Thus these springs 248 maintain a constant upward pull on the pair of idlers 238, thus maintaining a stress or tension on the sprocket chain 234.

The indicating and registering mechanism is substantially as follows, having reference particularly to Figs. 9, 10 and 13:

A small casing 251 is suitably mounted and located in the upper part of the stand 241 and has an upper shaft 252 journaled therein. On this shaft there are a pair of rotatable sleeves 252' on which are a pair of small sprocket gears 253 secured thereto, and over these sprocket gears there are a pair of chains 254, each chain being secured to one side of the gear as indicated at 255. The free end of each of the chains 254 is connected to a draw rod 256 and each of these rods passes through an opening 257 in each of the weighing or balancing levers 243. Compression springs 258 coiled on the ends of the draw rods 256 engage between the balancing levers 243 and nuts 259 on the end of each of the draw rods. Each rod is, in addition, provided with a stop nut 260. By this construction, when the levers 243 are operated in an up-and-down swivelling motion, motion is transmitted to the sleeves 252' on the shaft 252. On each of the sleeves 252' there is a second sprocket 261 and also connected to each of these sleeves there is a pointer 262. These pointers swing over an index plate 263, which is graduated, as hereunder set forth.

The registering mechanism is interconnected with the sleeves 252' which operate the indicator pointers in the following manner, having reference particularly to Figs. 9, 10 and 13:

A lower shaft 264 is mounted in the casing 251 and has a pair of sleeves 265 mounted thereon, and on each sleeve there is a printing wheel or disc 266; also on each sleeve there is a small sprocket gear 267. In addition, there is an idler shaft 268 with idler sprockets 269. A pair of sprocket chains 270 pass over each of the sprockets 261 and have one end 271 of each chain attached to each of the sprockets. These chains pass downwardly engaging with the small sprockets 267 connected to the sleeves 265 on the lower shaft 264, thence pass upwardly over the idlers 269 on the idler shaft 268 and drop downwardly, having a cord 272 connected to the end of the chains. This cord drops in a loop and has a weight 273 suspended therefrom by means of a pulley 274. By this construction, when the pointers 262 shift over the dial, the printing wheels or discs 266 are operated.

The printing mechanism is substantially as follows, having reference particularly to Figs. 9, 10, 16 and 17:

A shelf 275 forms the bottom of the casing 251 and connects with an opening 276 in the front of the stand 241 for the insertion and removal of cards to be printed. Depending from this shelf there is a cage 277, in which is mounted a solenoid 278 and in the solenoid there is an armature 279 having a stem 280 extending upwardly and passing through a guide-way 281, forming part of the cage. A platen 282 is connected to the upper part of the stem 280, this platen being wide in a transverse direction of the machine, as indicated by 283 (Fig. 10) and narrow in the other direction (Fig. 16). This platen operates through a slot 284 in the shelf 275. The platen is preferably weighted by weights 285. A compression spring 286 engages the lower part of the yoke 281 and a collar 287 on the stem 280, thereby tending to normally thrust such stem downwardly, and normally hold the platen in its lower position. When the solenoid is energized, the armature 279 is elevated, thus thrusting the stem and the platen 282 upwardly so that a card placed on the shelf is thrust in an upward direction, coming in contact with the type 288 on each of the printing discs or wheels 266. The type used is solid and makes an impression through a carbon-coated or equivalent type of paper, making preferably two or three copies.

The manner of operation and functioning of the machine in its several aspects is substantially as follows:

It is preferable to have a remote control switch 290 having a plurality of switches 291 therein, and connected by a cable 292 to the stand 241, one of the switches being designed to control the electric motor and the other to control the energization of the solenoids. The cable is utilized so that an operator in testing the brakes of an automobile may be seated in the driver's compartment.

The automobile to be tested has the wheels which are to undergo the test run on the drums 203 and 207 and the idlers 220, these idlers being tilted until the wheels occupy the correct position in regard to the drums, and the load carried by such wheels. The height of the idlers is regulated by controlling the hydraulic cylinder 230 with the piston 229 therein through the medium of the flow of the hydraulic fluid through the pipes 231, which is under control of suitable valves. The operator starts the electric motor, which, through the gear train of the pinion 228 and gear 229, operates sprockets 215 and 216, hence driving the tubular and the solid shafts 208 and 204, and rotating the drums 203 and 207. In the normal operation without applying the brakes to the wheels, the device may be adjusted so that the pull on the driving chains 234 is insufficient to operate the balancing or weighing lever, so that the pointers 262 remain at zero. If, due to internal friction, the wheels do not rotate sufficiently free, the spring 258 may be adjusted by means of a nut 259 on the rod 256 so that the balancing lever may move slightly and still leave the pointers pointing at zero. When the brakes are applied there is a resistance and rotation of the drums, hence pulling tension on the sprocket chains 234, and a pulling downwardly on the idlers 238, hence moving the blocks 237 downwardly giving a downward leverage on the weighing levers 243, these levers each operating against the tension of the springs 248. The motion of each lever is transmitted by the medium of the rods 256 to the sprocket gears 253 on the sleeves 252' to the pointers 262 which swing over the scale and will show the number of pounds pressure of the resistance of each of the brakes on each of the wheels. If the braking is even on both wheels under test, the pointers will operate together; if not, they will show different readings.

The motion from the sleeves 262 is conveyed by the gears 261 and chains 270 to the printing wheels or discs 266, these discs rotating, therefore, in synchronism with the movement of the pointers. When the operator testing the brakes by watching the pointers ascertains that the maximum braking power of the brakes has been obtained, he presses the push button, energizing the solenoid, which causes the upward movement of the armature, the stem 280, the platen 282, and causes a printing of the record on cards or the like which have previously been inserted on the shelf underneath the printing wheels. Therefore a printed and permanent record is obtained of the brake test.

It will be noted that the flexible transmission sprocket chain 234, when under tension due to the driving force of the power mechanism operating the drums, that as the tension varies on the chain the idler 238 has an up-and-down movement. This is in effect a weighing machine and may be coupled to a weighing mechanism such as the balancing lever 243 which may operate any type of device for indicating and recording weight. It is obvious, therefore, that this principle of having a flexible power transmission move in a transverse direction under changes of tension of such transmission that a resistance or weight may be measured. It is intended in our brake testing machine that the pointers indicate the resistance as so many pounds pressure and that the printing mechanism also records this in pounds. Therefore a standard may be set for the testing of brakes suitable for general use. It is manifest that other standards of weight may be utilized instead of the pound.

Figures 9, 16, 17, 18:
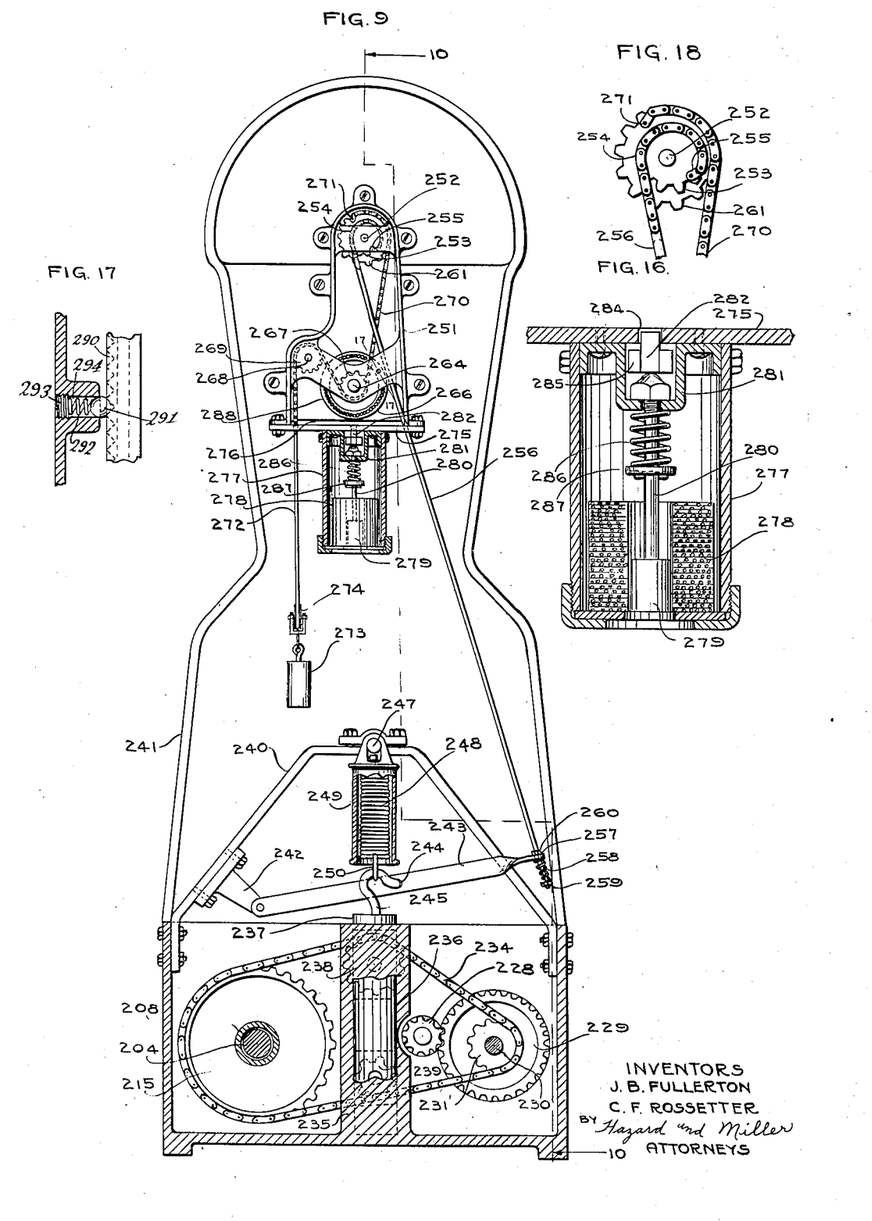
Figure 9 is a vertical transverse elevation, partly broken away, of the second type of brake testing and registering mechanism, as if taken on the line 9—9 of Fig. 10 in the direction of the arrows, illustrating principally the resistance or weighing part of the machine and the indicating and registering features thereof.
Figure 16 is an enlarged section through the solenoid construction to raise the cards for printing.
Figure 17 is a detail section on the line 17—17 of Fig. 9 showing the centering mechanism for the printing wheel.
Figure 18 is an enlarged detail of the sprocket wheel operated by the weighing mechanism to shift the pointers.
Figures 10, 13:
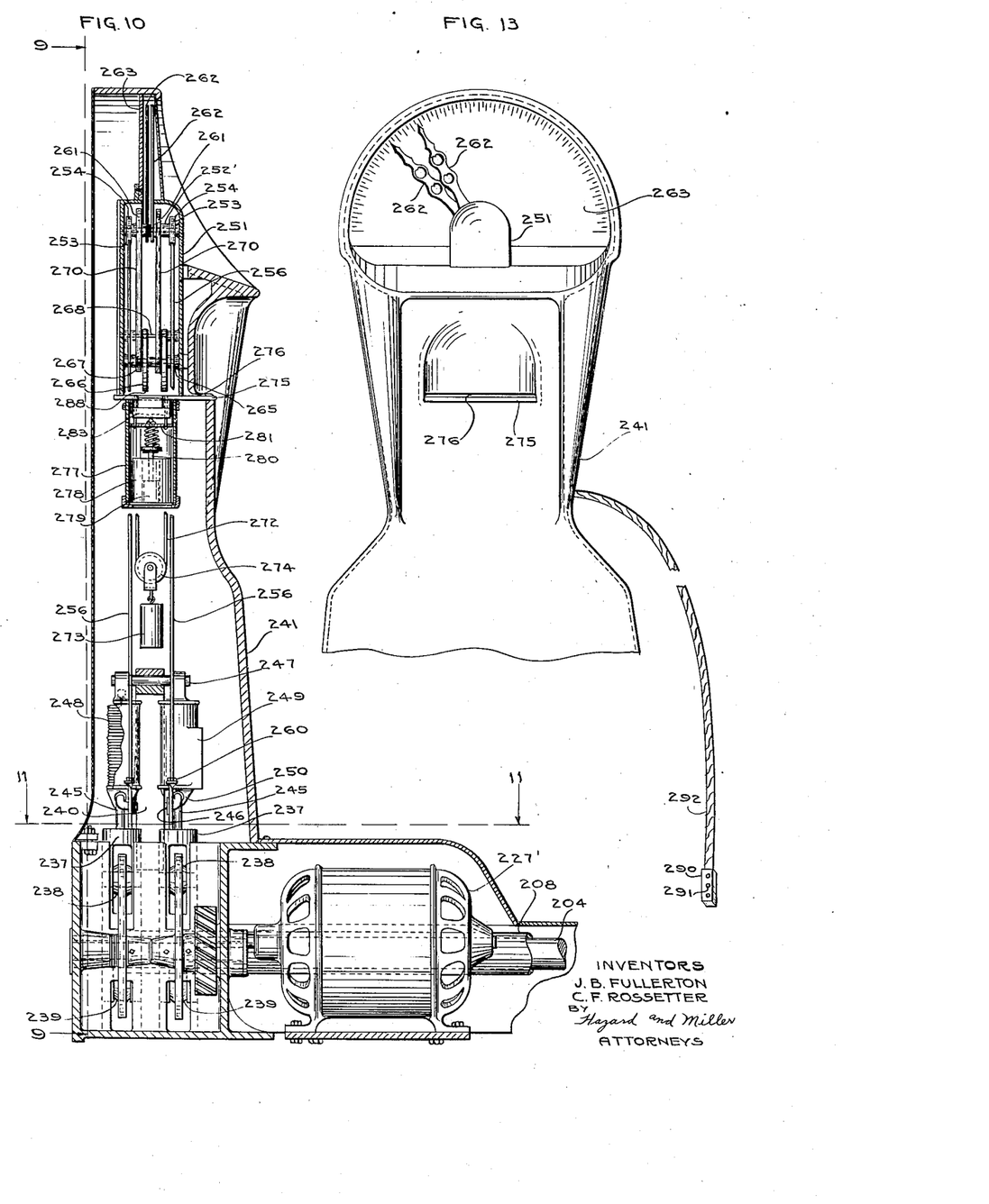
Figure 10 is a vertical transverse section on the irregular line 10—10 of Fig. 9 in the direction of the arrows.
Figure 13 is a partial front elevation of the indicating and registering mechanism, taken in the direction of the arrow 13 of Fig. 10.

In Fig. 17 we show a centering mechanism for the printing wheel 266. This wheel is provided with a series of notches 290 which are engaged by a ball 291, this being pressed by a spring 292 having a plug 293 forming a seat for the spring. The plug, the spring and the ball are mounted in a transverse opening 294 in part of the small casing structure 251 (see Figs. 9 and 17). By this construction the printing wheel or disc is given a species of jumping motion by the ball engaging in the notches, and there being a certain slack motion between the wheel and the driving sprocket therefor, so that there will always be a printing type directly below the wheel and in alignment with the platen 282, so that the printing may be correct at any instant in which the solenoid is operated.

In Figs. 9 and 18 is illustrated the construction to swing the pointers for indicating the resistance of the wheel to rotation so that these will move over an evenly graduated arc. When the first pressure is applied, the first movement downwardly of the weighing lever 243 is accomplished with a comparatively slight resistance, hence the small sprocket gears 253 are made eccentric to the shaft 252, and as the stress is increased, the outer periphery of these gears is at a greater distance from the shaft 252, thus giving greater leverage and moving the pointers a substantial equal distance for equal increments of the weight actuating the weighing levers 243, the even graduation being indicated in Fig. 13.

Various changes may be made in the principles of our invention without departing from the spirit thereof, as set forth in the description, drawings and claims.

We claim:

1. A brake testing machine comprising a drum for supporting a vehicle, a shiftable sleeve, driving means for the drum, yielding means connecting the drum to the driving means, and means connecting the sleeve to the drum to slide the sleeve on applying a brake to the wheel, and a registering mechanism operatively connected to the sleeve to register resistance of the brake.

2. A brake testing machine comprising a rotatable cylinder, driving means for the cylinder, a drum for supporting a vehicle wheel interconnected with the cylinder to allow relative rotation of the cylinder and a drum on applying a brake to the wheel, a slidable sleeve, means interconnecting the sleeve with the drum to slide said sleeve on the relative rotation of the drum in relation to the cylinder, a registering mechanism interconnected to the sleeve to register resistance of the brake.

3. A brake testing machine comprising a rotatable cylinder, means to drive the cylinder, a drum on the cylinder for supporting a vehicle wheel, means yieldingly connecting the drum and cylinder to drive the drum from the cylinder, and providing relative rotation thereof on applying a brake associated with the wheel, a sleeve slidable in the cylinder, a screw secured to the sleeve and slidable on the cylinder, a nut secured to the drum meshing with the screw, and an indicating mechanism connected to the sleeve to indicate the resistance of the brake.

4. A brake testing machine comprising a rotatable cylinder, having means to drive same, a drum, a spring connecting the cylinder and the drum to rotate the drum from the cylinder, the drum being adapted to support the wheel to be tested, a sleeve slidable in the cylinder having a screw to slide with the sleeve, a nut meshing with the screw secured to the drum, the interaction of the nut and the screw on the retarding of the drum due to application of the brake for the wheel sliding the sleeve longitudinally, and a lever interconnected to the sleeve to oscillate with the sliding movement of the sleeve.

5. A brake testing machine comprising a drum, and a roller for supporting a wheel having a brake to be tested, means movable beneath the roller to raise and lower the roller, means to rotate the drum, yieldable means connecting the drum to the rotating means, a shiftable device interconnected with the drum to be actuated on applying of the brake, and an indicating mechanism connected to the shiftable device.

6. A brake testing machine comprising a drum for supporting a vehicle wheel, a rotatable member supporting the drum, means yieldingly connecting the drum and rotatable member, an axially movable member interconnected with the drum, an electric motor, means connecting the motor to the rotatable member to drive the drum from the motor, a control switch for the motor, means actuated by the drum on the application of a brake to the wheel to move the axially movable member, and an indicating means operated by the axially movable member to show the resistance of the wheel brake.

7. A brake testing machine comprising a movable device for supporting a vehicle wheel having an associated brake, electrically operated means to operate the device, a controlling switch for the electrical means, a rotatable and axially movable member connected to the supporting means and actuated on applying the brake, indicating and registering devices connected to the rotatable and axially movable member, electromagnetic means for controlling the registering device and a second switch for said electromagnetic means.

8. In a brake testing machine, the combination of a plurality of pairs of rollers, each pair adapted to support a vehicle wheel, means for driving one roller of each pair, members arranged concentric to the rollers and movable axially thereby, and means connecting the members for simultaneously measuring and recording the brake resistance of each supported wheel.

9. In a brake testing machine, the combination of a plurality of driving rollers each arranged to impart rotation to a vehicle wheel against its brake resistance, means for driving the rollers, a member for driving said rollers, and concentric, rotatable and axially movable members connected to the rollers to simultaneously and individually measure and record the brake resistance of the driven wheel.

10. In a brake testing machine, the combination of a rotatable drum for supporting an automobile wheel, means to rotate the drum, including a yielding element connecting the rotating means to the drum, a member connected to the drum and its rotating means and movable axially thereto upon the application of the brake to the wheel, and a recording mechanism connected to the shifting means to give a record of the resistance of the brake.

11. In the art described the combination of a plurality of drums to support vehicle wheels, concentric shafts connected to the respective drums, a power mechanism having a pair of driving wheels, a flexible transmission driving said shafts from the said wheels, a plurality of balancing levers pivotally mounted, a slidable block connected to each lever, wheels on said blocks engaging the flexible transmission, and an indicating and registering mechanism connected to said lever and actuated thereby.

12. In the art described, a moving supporting device for vehicle wheels, a driving mechanism for said device, a weighing mechanism operatively connected to the supporting device and operated by the resistance to the movement of the said device, a rod connected to said weighing mechanism, a shaft having a pointer, a second shaft having a printing wheel, a chain interengaging sprocket wheels on said shafts and the said rod, said chain being counterweighted, a shelf, a platen slidable in relation to said shelf, and a solenoid to actuate said platen.

13. A brake testing machine comprising a rotatable member, means for driving the member, a drum rotatable on the member, means yieldingly connecting the drum and the member, a rotatable and axially movable member, means interconnecting the drum and the rotatable and axially movable member to move the rotatable and axially movable member axially on relative rotation of the drum and the rotatable member, and means connected to the rotatable and axially movable member for measuring the resistance to rotation of the drum.

14. A brake testing machine comprising a rotatable shaft, means for rotating the shaft, drums positioned for rotation on the shaft, means yieldingly connecting the drums to the shaft, a pair of concentric rotatable and axially movable members connected respectively to the respective drums and adaptable for axial movement upon relative rotation of the drums and the shaft, and means operatively connected to the concentric members to measure and register the resistance of the brakes.

15. A brake testing machine comprising a rotatable shaft, means for rotating the shaft, a drum positioned for rotation on the shaft for supporting a wheel having a brake, means yieldingly connecting the drum to the shaft, a rotatable and axially movable member arranged concentrically to the shaft, means interconnecting the drum and the axially movable member to move the axially movable member upon relative rotation of the roller and the shaft due to the application of the brake on the wheel, and means operatively connected to the member to measure and register the resistance of the brakes.

16. A brake testing machine comprising a rotatable hollow shaft, means for rotating the shaft, drums positioned for rotation on the shaft for supporting wheels having brakes, means yieldingly connecting the drum to the shaft, a pair of concentric rotatable and axially movable members positioned concentrically within the shaft, means interconnecting the drums to the respective concentric members for moving the concentric members axially upon relative rotation between the drums and the shaft due to an application of the brakes on the wheels, and means operatively connected to the members for measuring and registering the resistance of the brakes.

In testimony whereof we have signed our names to this specification.

CHARLES F. ROSSETTER.
J. B. FULLERTON.